(12) United States Patent
Ajbani et al.

(10) Patent No.: US 7,365,131 B2
(45) Date of Patent: *Apr. 29, 2008

(54) THERMOPLASTIC VULCANIZATE COMPOSITION

(75) Inventors: Manoj Ajbani, Copley, OH (US); Christopher Kiehl, Akron, OH (US); Thierry Florent Edme Materne, Lasne (BE)

(73) Assignee: The Goodyear Tire & Rubber Company, Akron, OH (US)

( * ) Notice: Subject to any disclaimer, the term of this patent is extended or adjusted under 35 U.S.C. 154(b) by 431 days.

This patent is subject to a terminal disclaimer.

(21) Appl. No.: 11/106,977

(22) Filed: Apr. 15, 2005

(65) Prior Publication Data

US 2005/0245679 A1 Nov. 3, 2005

Related U.S. Application Data

(60) Provisional application No. 60/566,167, filed on Apr. 28, 2004.

(51) Int. Cl.
*C08F 8/00* (2006.01)
*C08L 33/04* (2006.01)
*C08L 9/00* (2006.01)
*C08L 23/00* (2006.01)
*C08L 23/04* (2006.01)
*C08G 18/42* (2006.01)

(52) U.S. Cl. ............... 525/191; 525/192; 525/194; 525/222; 525/232; 525/238; 525/240; 525/241; 524/500; 524/515

(58) Field of Classification Search ............ 525/191, 525/192, 194, 222, 232, 238, 240, 241; 524/500, 524/515

See application file for complete search history.

(56) References Cited

U.S. PATENT DOCUMENTS

| 3,686,364 | A | 8/1972 | Robinson et al. | |
|---|---|---|---|---|
| 3,758,643 | A | 9/1973 | Fisher | |
| 3,865,776 | A | 2/1975 | Gergen | |
| 4,104,210 | A | 8/1978 | Coran et al. | 525/232 |
| 4,130,535 | A | 12/1978 | Coran et al. | 524/487 |
| 4,202,801 | A | 5/1980 | Petersen | 525/232 |
| 4,250,273 | A | 2/1981 | Bohm et al. | 525/99 |
| 4,271,049 | A | 6/1981 | Coran et al. | 525/191 |
| 4,311,628 | A | 1/1982 | Abdou-Sabet et al. | 525/232 |
| 4,340,684 | A | 7/1982 | Bohm et al. | 525/194 |
| 4,343,918 | A | 8/1982 | Bohm et al. | 525/194 |
| 4,444,236 | A | 4/1984 | Kan et al. | |
| 4,553,578 | A | 11/1985 | Vitus et al. | |
| 4,957,968 | A | 9/1990 | Adur et al. | 525/74 |
| 5,051,478 | A | 9/1991 | Puydak et al. | 525/195 |
| 5,064,910 | A | 11/1991 | Hattori et al. | 525/359.1 |
| 5,112,919 | A | 5/1992 | Furrer et al. | 525/263 |
| 5,248,729 | A | 9/1993 | Inoue et al. | |
| 5,334,677 | A | 8/1994 | Razavi et al. | 526/114 |
| 5,362,794 | A | 11/1994 | Inui et al. | 524/496 |
| 5,476,914 | A | 12/1995 | Ewen et al. | 526/351 |
| 5,616,651 | A | 4/1997 | Nino et al. | 525/305 |
| 5,672,660 | A | 9/1997 | Medsker et al. | 525/101 |
| 5,677,399 | A | 10/1997 | Hall | 526/83 |
| 5,786,441 | A | 7/1998 | Lawson | 528/229 |
| 5,843,577 | A * | 12/1998 | Ouhadi et al. | 428/474.7 |
| 5,936,028 | A | 8/1999 | Medsker et al. | 524/506 |
| 6,008,295 | A | 12/1999 | Takeichi et al. | 525/105 |
| 6,084,031 | A | 7/2000 | Medsker et al. | 525/192 |
| 6,090,880 | A | 7/2000 | Zimmer et al. | 524/492 |
| 6,147,160 | A | 11/2000 | Wang et al. | 525/106 |
| 6,150,464 | A | 11/2000 | Medsker et al. | 525/101 |
| 6,169,145 | B1 | 1/2001 | Medsker et al. | |
| 6,228,908 | B1 | 5/2001 | Takeichi et al. | 524/27 |
| 6,251,998 | B1 | 6/2001 | Medsker et al. | 525/192 |
| 6,252,007 | B1 | 6/2001 | Oziomek et al. | 525/332.6 |
| 6,288,171 | B2 * | 9/2001 | Finerman et al. | 525/192 |
| 6,337,374 | B1 | 1/2002 | Ngoc et al. | 525/226 |
| 6,448,343 | B1 | 9/2002 | Schombourg et al. | 525/288 |
| 6,503,984 | B2 | 1/2003 | Johnson et al. | 525/70 |
| 6,790,911 | B2 * | 9/2004 | Perevosnik et al. | 525/191 |
| 6,797,779 | B1 * | 9/2004 | Ajbani et al. | 525/191 |
| 7,150,919 | B2 * | 12/2006 | Ajbani et al. | 428/492 |
| 7,264,868 | B2 * | 9/2007 | Ajbani et al. | 428/217 |
| 2003/0083434 | A1* | 5/2003 | Ouhadi et al. | 525/80 |
| 2005/0182193 | A1* | 8/2005 | Ajbani et al. | 525/88 |

* cited by examiner

*Primary Examiner*—Nathan M. Nutter
(74) *Attorney, Agent, or Firm*—Alvin T. Rockhill

(57) ABSTRACT

A thermoplastic vulcanizate composition comprised of (a) thermoplastic resin selected from the group consisting of polyphenylene ether, polypropylene, polyethylene, and polystyrene, (b) at least one elastomer selected from the group consisting of butadiene-isoprene copolymer rubbers, copolymers of a conjugated diolefin monomer and an acrylate monomer, copolymers of a conjugated diolefin monomer and an methacrylate monomer, copolymers of a conjugated diolefin monomer and a vinyl aromatic monomer, copolymers of a conjugated diolefin monomer and an acrylonitrile monomer, blends of polyisoprene rubber with styrene-butadiene rubber, wherein the elastomer is at least partially crosslinked, wherein the repeat units in the elastomer are distributed throughout the elastomer in an essentially random manner, and (c) oil.

24 Claims, No Drawings

THERMOPLASTIC VULCANIZATE COMPOSITION

This patent application claims the benefit of the priority of U.S. Provisional Patent Application Ser. No. 60/566,167, filed on Apr. 28, 2004, and incorporates by reference herein the teachings of U.S. Provisional Patent Application Ser. No. 60/566,167 in their entirety.

BACKGROUND OF THE INVENTION

Plastic handles of various shapes and sizes are found on many household items. Such household items include toothbrushes, shaving razors, hairbrushes, pens, tools, kitchen appliances and kitchen utensils. These household items have a variety of functions, but in most cases, it is desirable for the user to grip the handle of these items firmly, so that it does not fall out of the user's hand. In other cases, such as with a knife or fork or a tool, it is desirable for the item to be gripped with even more firmness so that it can be leveraged.

Because the handles of these household items are normally made of a hard plastic, the simplest tasks can become problematic. As in the case of a toothbrush or shaving razor, the handle generally comes into contact with water. When the toothbrush or razor is wet, it is difficult to grip and may slip out of the user's hands. Other items such as tools or kitchen utensils can have handles that are difficult to hold onto or uncomfortable to grip because of the hardness of the plastic material. For persons suffering from arthritis, carpal tunnel syndrome or other hand injuries or infirmities, using these basic household objects can become more difficult or even impossible.

Most people would prefer to grip objects with a softer handle that is more soothing to the touch and easier to grip. Accordingly, a need exists for a soft grip handle that can be grasped firmly and comfortably and which requires minimum strength and dexterity to grip and maneuver.

U.S. Pat. No. 4,250,273 suggests a thermoplastic elastomer composition comprising from about 10 to about 50 parts of a crystalline olefin polymer, from about 80 to about 15 parts by weight of a random styrene-butadiene rubber, and about 5 to about 55 parts by weight of a highly saturated elastomer.

U.S. Pat. No. 4,340,684 suggests a thermoplastic elastomer composition comprising from about 10 to about 50 parts of a crystalline olefin polymer, from about 80 to about 15 parts by weight of a random styrene-butadiene rubber, and about 5 to about 55 parts by weight of a highly saturated elastomer, where in the blend was partially cured so that a thermoplastic elastomer was formed which had a melt flow index of at least 1.0 when tested in accordance with ASTM D 1238 condition L at a load of 100 pounds. The authors suggest that when the melt flow rate of the formed blend was less than 1.0, thermosetting formulations were formed.

U.S. Pat. No. 4,343,918 claims the process for making a thermoplastic elastomer composition comprising from about 10 to about 50 parts of a crystalline olefin polymer, from about 80 to about 15 parts by weight of a random styrene-butadiene rubber, and about 5 to about 55 parts by weight of a highly saturated elastomer.

U.S. Pat. No. 4,927,882 claims a thermoplastic elastomer composition having a compression set less than about 30% and produced by dynamic vulcanization of SBR to form a dispersed phase of crosslinked SBR in a co-continuous matrix of SEBS and polypropylene. The compositions had specific use in the pharmaceutical applications.

U.S. Pat. No. 4,957,968 discloses a adhesive thermoplastic elastomer composition consisting essentially of: (a) about 15 to 40 weight percent of at least one polyolefin selected from the group consisting of polyethylene, polypropylene and mixtures thereof, modified by grafting with an unsaturated an aliphatic carboxylic acid or its derivatives selected from the group consisting of acid anhydride, acid chloride, isocyanate, oxazoline, epoxide, amine and hydroxide; (b) about 10 to 70 weight percent of at least one other non-elastomeric polyolefin resin prepared from at least one monomer selected from the group consisting of: butene, isobutylene, octene-1,4-methyl pentene-1, ethylene, propylene, hexene-1 or mixtures thereof; and (c) about 20 to 80 weight percent of at least one partially cured olefinic elastomer, selected from the group consisting of elastomeric ethylene-propylene copolymer, elastomeric ethylene-propylene copolymers, elastomeric ethylene-propylene terpolymers, polyisoprene, polyisobutylene, polybutadiene, and natural rubber; wherein said partial cure of the elastomer is attained by a curing agent comprising about 1 to 99 percent of the amount necessary for a substantially complete cure.

U.S. Pat. No. 6,503,984 discloses a thermoplastic elastomer having adhesion to metal, molded polar polymers and textile fibers, said thermoplastic elastomer comprising: a) a dynamically crosslinked rubber, b) from about 20 to about 400 parts of a first polyolefin having from about 10 to about 26.5 weight percent crystallinity and a flexural modulus (tangent) from about 5,000 psi (34.5 Mpa) to about 20,000 psi (138 Mpa), and c) from about 10 to about 200 parts by weight of a functionalized polyolefin having pendant polar functional groups, wherein said polar functional groups are present at a level of about 0.5 to about 3.5 mole percent of the total repeating units of said functionalized polyolefin and said functionalized polyolefin is derived from polymerizing at least one monoolefin to form a semicrystalline polymer or is derived from hydrogenating the polydiene blocks of a block copolymer, and wherein said parts by weight are based on 100 parts by weight of crosslinked rubber.

There is a growing demand for a wide variety of articles that are soft and soothing to touch. It is, of course, also important for these articles to have the strength, durability, and rigidity needed in the applications where the articles are used. This can be accomplished by overmolding a soft thermoplastic composition onto on a hard thermoplastic substrate. However, there is a need for a soft thermoplastic elastomer composition that can be overmolded onto a hard thermoplastic resin substrate wherein the soft thermoplastic composition has lower hardness, good oil resistance and low compression set.

SUMMARY OF THE INVENTION

This invention relates to a thermoplastic elastomer that can be overmolded onto a hard substrate, such as a plastic or metal surface. The thermoplastic elastomer composition of this invention offers the lower cost and lower hardness. It is also essentially odor-free, scratch resistant and can be colored as desired.

The present invention provides a low cost, gentle to the touch material for an easy to grip handle made from a soft thermoplastic elastomer composition overmolded on a hard thermoplastic resin substrate wherein the soft thermoplastic composition has lower hardness and superior feel and comfort.

The thermoplastic elastomer composition of this invention can be beneficially used in making grips or handles for articles of manufacture including, but not limited to, toothbrushes, shaving razors, hairbrushes, hairdryers, paintbrushes, pens, tools (saws, hammers, screwdrivers, wrenches, pliers), kitchen appliances (handles for refrigerator doors, ovens, dishwashers, bread warmers, trash compactors), kitchen utensils (spoons, forks, knives, spatulas, shish kabob skewers, vegetable peelers, can openers, bottle openers, corkscrews, whisks, basting brushes), vacuum cleaner handles, brooms, mops, rakes, shovels, scissors, sporting equipment (fishing poles, tennis rackets, firearms, and golf clubs), and dinghy brushes.

The present invention discloses a thermoplastic vulcanizate composition comprised of (a) thermoplastic resin selected from the group consisting of polyphenylene ether, polypropylene, polyethylene, and polystyrene, (b) at least one elastomer selected from the group consisting of butadiene-isoprene copolymer rubbers, copolymers of a conjugated diolefin monomer and an acrylate monomer, copolymers of a conjugated diolefin monomer and an methacrylate monomer, copolymers of a conjugated diolefin monomer and a vinyl aromatic monomer, copolymers of a conjugated diolefin monomer and an acrylonitrile monomer, blends of polyisoprene rubber with styrene-butadiene rubber, wherein the elastomer is at least partially crosslinked, wherein the repeat units in the elastomer are distributed throughout the elastomer in an essentially random manner, and (c) oil.

DETAILED DESCRIPTION OF THE INVENTION

The thermoplastic resin is normally a polyolefin resin or polystyrene. The polyolefin resin can be polyethylene, isotactic polypropylene, syndiotactic polypropylene, polypropylene impact copolymers containing about 1-7 percent by weight of ethylene, butene, hexene, or octene, polyolefin copolymers such as ethylene-butene, hexene, or octene, polybutene, reactor grade modified polypropylene, oxypolyolefin, or metallocene polypropylene. Syndiotactic polypropylene resins are highly preferred. Isotactic polypropylene copolymers with ethylene, butene or hexene that are prepared with traditional Ziegler-Natta catalyst (non-metallocene catalyst) are also highly preferred.

Syndiotactic polypropylenes that are described in U.S. Pat. No. 5,476,914 and U.S. Pat. No. 5,334,677 may be used in preparing the thermoplastic elastomer compositions. The teachings of U.S. Pat. No. 5,476,914 and U.S. Pat. No. 5,334,677 are incorporated herein by reference. The syndiotactic polypropylenes used may be homopolymers or copolymers. The syndiotactic polypropylenes utilized in the present invention comprise at least 15 percent syndiotactic molecules, more preferably at least 50 percent syndiotactic molecules, and most preferably at least 82% syndiotactic molecules. Syndiotactic homopolymers or copolymers with ethylene may be used. For instance, commercial syndiotactic polypropylenes, such as those sold by Atofina may be used. The syndiotactic polypropylene used will preferably have a melt flow rate greater than 0.5 g/10 minutes at 230° C./2.16 kg load as determined by ASTM D 1238, more preferably between 10 and 110 g/10 minutes.

A reactor grade impact modified polypropylene can also be used. A publication article in Modern Plastics Encyclopedia/89, mid October 1988 Issue, Volume 65, Number 11, pages 86-92, describes several types of polypropylenes, which is incorporated herein as a reference for the types of polypropylenes that may be used in the blends of the said invention. Metallocene based polypropylene resins that may be produced by single-site technology can also generally be used. The polypropylene produced by methods described in "Metocene™, Precise Tailoring of Polypropylene Resins Using Single-Site Technology," David Fischer, Presented at the SPE Automotive TPO Global Conference 2001, Hyatt Regency, Dearborn, Mich., Oct. 1-3, 2001, can also normally be used. The teachings of this reference are incorporated herein by reference.

Reactor grade thermoplastic olefins (TPOs) as produced by Basell Polyolefins and as described in TPE 2003 Conference Proceedings, RAPRA Technology Limited, Brussels, Belgium, Sep. 16-17, 2003, page 73 may also be used as a resin when a lower modulus and low hardness soft grip is desired. A linear low-density polyethylene resin may also be used for lower modulus soft-grips.

Syndiotactic or semi-crystalline polystyrenes may also be used in this invention. Atactic polystyrenes are highly preferred.

The thermoplastic resins that are useful in the present invention can also include polyphenylene ether (PPE) resins (also known within the art as "Polyphenylene Oxide"), styrene containing resins such as styrene-acrylonitrile resins (SAN), acrylonitrile-butadiene resins (ABS), and the functionalized versions of PPE and styrene containing resins that contain one functional group selected from the group consisting of maleic anhydride, hydroxyls, amines, epoxides, and glycidyl methacrylates.

The functional groups are particularly useful for compatibilizing the thermoplastic resins with the saturated block copolymers and the diene containing elastomers by virtue of reactive grafting of the functional groups present on the said thermoplastic resins with the functional groups present on the saturated block copolymers and the diene containing elastomers.

Polyphenylene ether resins that are most useful in this invention include but are not limited to poly(2,6-dimethyl-1,4-phenylene ether), poly(2,6-dimethyl-co-2,3,6-trimethyl-1,4-phenylene ether), poly(2,3,6-trimethyl-1,4-phenylene ether), poly(2,6-diethyl-1,4-phenylene ether), poly(2-methyl-6-propyl-1,4-phenylene ether), poly(2,6-dipropyl-1,4-phenylene ether), poly(2-ethyl-6-propyl-1,4-phenylene ether), poly(2,6-dilauryl-1,4-phenylene ether), poly(2,6-dephenyl-1,4-phenylene ether), poly(2,6-dimethoxy-1,4-phenylene ether), poly(1,6-diethoxy-1,4-phenylene ether), poly(2-methoxy-6-ethoxy-1,4-phenylene ether), poly(2-ethyl-6-stearyloxy-1,4-phenylene ether), poly(2,6-dichloro-1,4-phenylene ether), poly(2-methyl-6-phenyl-1,4-phenylene ether), poly(2-ethoxy-1,4-phenylene ether), poly(2-chloro-1,4-phenylene ether), poly(2,6-dibromo-1,4-phenylene ether), and poly(3-bromo-2,6-dimethyl-1,4-phenylene ether), their respective homopolymers or copolymers. Polyphenylene ether resins (also known in the art as PPE and poly phenylene oxide or PPO) used may be of a wide range of molecular weights. The molecular weights will preferably be less than 100,000 g/mole, more preferably below 70,000 g/mole, most preferably below 50,000 g/mole. The other measure of molecular weight is the intrinsic viscosity measurement that is a dilute solution viscometry method. For example, a medium molecular weight polyphenylene ether resin may have an intrinsic viscosity value of 0.4 dl/g, when measured in chloroform solvent. Such polyphenylene ether resins are available from The General Electric Company's Specialty division or Crompton Corporation under the name Blendex® HPP820. Blends of polyphenylene ether and polystyrene in the ratio of 70:30 are also available under the grade name Blendex® HPP830 and may also be used in this invention.

The elastomer polymerized by solution polymerization techniques can be a diene elastomer that is made with polymerization in a solvent such as hexane or cyclohexane. Such elastomers are well known to those skilled in this art. U.S. Pat. No. 6,566,478, U.S. Pat. No. 6,313,216, U.S. Pat. No. 6,372,863, U.S. Pat. No. 6,293,325, U.S. Pat. No. 6,289,959, U.S. Pat. No. 6,140,434, U.S. Pat. No. 5,844,044, U.S. Pat. No. 5,679,751, U.S. Pat. No. 5,677,402, U.S. Pat. No. 5,448,003, U.S. Pat. No. 5,239,009 and U.S. Pat. No. 5,272,220 generally describe such elastomers and methods for their synthesis. The teachings of these United States patents are incorporated herein by reference with respect to their description of such elastomers and their synthesis. The elastomers used will be substantially random. Solution elastomers such as synthetic-polyisoprene may also be used. The solution elastomers used may be styrene-butadiene random copolymer or styrene-isoprene random copolymer with about 10 to about 50% by weight of bound styrene content. The random copolymer may have short blocks of styrene units wherein about 2-10 styrene units are randomly distributed along the elastomer. The short block content will vary depending upon the total styrene content in the elastomer. The Mooney viscosity of the said solution elastomer may be in the range of about 15 to about 120 Mooney as measured per ML 1+4 at 100° C. The styrene butadiene rubber will preferably have a vinyl content which is within the range of 10 to 60%.

The solution diene rubbers that are particularly useful in this invention for use as crosslinkable elastomers are the modified or coupled elastomers, such as copolymers of styrene and diene selected from butadiene and isoprene and the living polymer, before terminating the polymerization, modified with tin or silicon. Such modified elastomers may also be for example styrene/butadiene copolymers and styrene/isoprene/butadiene terpolymers. Homopolymers of diene may also be employed, but it is more preferred to have the styrene be present as a co-monomer. Copolymers of isoprene and 1,3-butadiene may also be used.

An important characteristics of the coupled elastomer, particularly the tin-modified elastomers, is that a substantial portion, preferably at least 40%, and more generally in the range of about 60 to about 85% of the tin (Sn) bonds or silicon (Si) bonds are bonded to the diene units of the styrene/diene copolymer, which may be referred herein as tin-dienyl or silicon-dienyl bond, for example butadienyl bonds in case of butadiene terminating with the tin (or silicon).

A copolymer-coupled elastomer may be prepared by copolymerization of styrene with 1,3-butadiene and/or isoprene in an organic solution with an alkyl lithium catalyst. A co-catalyst or catalyst modifier may also be used. Such polymerization methods are well known to those skilled in this art. After formation of the copolymer elastomer, but while the catalyst is still active and, therefore, while the copolymer is still considered a living or live polymer that is capable of further polymerization, the polymerization can be terminated by reacting the live polymer with a tin or silicon compound such as tin tetrachloride. This taking into account that the valence of tin is four, typically the modified copolymer is considered coupled or capped, with an accompanying molecular weight or viscosity jump or increase, and the modified copolymer being in what is sometimes called as a star shaped, or star configured, coupled elastomer. Coupling compounds similar to tin tetrachloride with a lower or higher valence may also be used to obtain an architecture that is higher or lower in the average number of arms that are obtained from a tin tetrachloride that has a valence of four. A tin coupled copolymer elastomer can also be obtained via coupling with an organo tin compound such as for example alkyl tin chloride, dialkyl tin chloride, and trialkyl tin chloride, resulting in variations in the tin coupled polymer with the trialkyl tin monochloride yielding simply a tin terminated copolymer.

Some examples of preparation of such coupled elastomers is further given in following Journal Articles: "Solution-Polymerized Rubbers with Superior Breakdown Properties," Journal of Applied Polymer Science Vol. 14, PP 1421-1432 (1970), "Tin Coupled SBRs: Relationship between Coupling Type and Properties," Paper No 78, Presented at $148^{th}$ Meeting of the Rubber Division, American Chemical Society, Cleveland, Ohio, Oct. 17-20, 1995, and "Newly Developed Solution SBRs for Low Rolling Resistance Tire," RCT 1990 V 63 #1, P 8-22, which are incorporated herein by reference.

Some examples of modified or coupled solution elastomers such as tin or silicon-coupled with several variations are given in U.S. Pat. No. 6,090,880, U.S. Pat. No. 5,064,910, U.S. Pat. No. 4,553,578, U.S. Pat. No. 4,444,236, U.S. Pat. No. 5,362,794, U.S. Pat. No. 5,677,399, U.S. Pat. No. 5,786,441, U.S. Pat. No. 6,008,295, U.S. Pat. No. 6,252,007, and U.S. Pat. No. 6,228,908, which are incorporated herein by reference, as they may also be used in thermoplastic elastomers as disclosed in this invention.

The rubbery elastomers that can further be used in the soft thermoplastic composition of this invention include ethylene-propylene-diene rubber, butyl rubber, halobutyl rubber, ethylene-co-octene elastomer, halogenated rubber copolymers of p-alkylstyrene and at least one isomonoolefin having from 4 to 7 carbon atoms, nitrile rubber, and the hydrogenated nitrile rubber.

The nitrile rubber or its hydrogenated version may contain the acrylonitrile units in the range of about 5 to about 50% by weight of the said rubber, and will not be very high as to maintain the rubber like elasticity. Such elastomers are commercially available from Zeon Chemicals. It may be necessary to use a compatibilizer to compatibilize the polar nitrile or hydrogenated nitrile rubber with the relatively non-polar block copolymer. The compatibilizer may consist of a combination of polar and non-polar segments. It is preferred that the compatibilizer is elastomeric in nature so that it has high extensibility and retractability. A polyamide-block-ether elastomer may be used to compatibilize the nitrile rubber or its hydrogenated derivative with the highly saturated block copolymer. The polyamide elastomers such as the polyamide-block-ether elastomer are commercially available from Atofina and are available under the trade name Pebax.

The diene containing elastomers may be dynamically vulcanized with hydrosilation curing systems in presence of the block copolymer and the thermoplastic resins. U.S. Pat. No. 6,251,998, U.S. Pat. No. 6,169,145, U.S. Pat. No. 6,150,464, U.S. Pat. No. 6,147,160, U.S. Pat. No. 6,084,031, U.S. Pat. No. 5,672,660, U.S. Pat. No. 5,936,028, and U.S. Pat. No. 4,803,244 teach the methods and hydrosilation crosslinking systems that are useful and can be used in this invention, the teachings of which are incorporated herein as a reference.

The dynamic vulcanization of the crosslinkable diene elastomer in the presence of the block copolymer and a thermoplastic resin may also be carried-out by either grafting the crosslinkable elastomer with a carboxylic acid anhydride or using a crosslinkable elastomer copolymerized with a carboxylic acid anhydride, and vulcanizing the said elastomer with an amino silane. U.S. Pat. No. 6,448,343 teaches the dynamic curing of elastomers with the amino silane curing agents and is incorporated herein by reference.

U.S. Pat. No. 5,112,919 describes a process of crosslinking a polyolefin thermoplastic resin with a silane and a free radical generator. The vinyl silane is grafted to the polyethylene with a free radical generator such as a peroxide and subsequently crosslinking the polyethylene with the aid of moisture. Typically longer curing times are required when polyolefins are crosslinked after the polyolefin articles are formed; particularly the crosslinking is performed below the melting point of the thermoplastic resin so as to retain the shape of the article. The teachings of the U.S. Pat. No. 5,112,919 are incorporated by reference for crosslinking the thermoplastic resin during the dynamic vulcanization of the diene rubber for blending with the saturated block copolymer. The vinyl silane, catalyst and a free radical generator containing cure systems are available from Crompton Corporation under the trade name XLPEARL dry silane masterbatches, and can be used in this invention.

The block copolymers that may be used in this invention are selected from the group of styrene-ethylene butylene-styrene (SEBS), styrene-ethylene propylene-styrene (SEPS), hydrogenated polybutadiene, hydrogenated polyisoprene, hydrogenated styrene-isoprene random copolymer, styrene-ethylene propylene (SEP) block copolymer, styrene-ethylene ethylene propylene-styrene (SEEPS) and hydrogenated styrene-butadiene random copolymer. The hydrogenation of random diene copolymers are described by authors E. W. Duck, J. R. Hawkins, and J. M. Locke, in Journal of the IRI, 6, 19, 1972, which may be used as the highly saturated elastomer in this invention and is incorporated herein as a reference. The saturated triblock polymers, SEBS and SEPS, with styrene end blocks are also used in this invention as the saturated elastomers. SEBS and SEPS are obtained on the hydrogenation of triblock copolymers of styrene and butadiene or styrene and isoprene and are known to be commercially available. Some commercial available examples of such elastomers include Kraton® G series polymers. U.S. Pat. No. 3,686,364 and U.S. Pat. No. 3,865,776 give some examples of block copolymers that may be used in the practice of this invention and are incorporated herein by reference. It is highly preferred that the highly saturated elastomer to be SEBS having a bound styrene content that is within the range of 15 weight percent to about 40 weight percent.

It is possible to use the saturated block copolymers that are modified versions of SEBS. Such modified block copolymers additionally have a substantial number of styrene units that are randomly distributed in the rubber midblocks of ethylene and butylene. These modified saturated block copolymers are supplied under Kraton®'A' series. Saturated block copolymers grades as mentioned in TPE 2003 RAPRA Conference Proceedings, Brussels, Belgium, Sep. 16-17, 2003, Paper 18, Page 157, and Paper 21, page 181 may also be used and are incorporated herein by reference.

Hydrogenated diblock elastomers of styrene and butadiene or styrene and isoprene can also be used as the highly saturated elastomers even though triblock elastomers are highly preferred. The highly saturated elastomers as used in this invention means that at least 75 percent of the original double bonds of the isoprene or butadiene units present prior to hydrogenation have been saturated by hydrogenation, more preferably at least 90 percent and most preferably 95 percent of the original double bonds have been saturated.

It is also possible to use the block copolymers in which the hard styrene blocks and the soft elastomeric blocks are crosslinked. The crosslinking of the block copolymer may be accomplished in the thermo-mechanical step for preparing the thermoplastic vulcanizate or the block copolymer may be pre-crosslinked. When a peroxide crosslinking agent is employed during the thermoplastic vulcanizate preparation, the soft elastomeric blocks in the block copolymer may be crosslinked during the mixing.

The Septon block copolymers of Kuraray Co., Ltd that are particularly useful in the practice of this invention contain reactive hard blocks that can be crosslinked in the composition.

The thermoplastic vulcanizate compositions formed by blending a polyolefin, polystyrene resin or a polyphenylene ether resin, a substantially random elastomer, and a highly saturated block copolymer elastomer may be overmolded on a hard thermoplastic resin substrate where the thermoplastic resin substrate has a glass transition temperature or a melt transition temperature of at least 70° C. as measured in a differential scanning calorimeter at a heating rate of 10° C. per minute. The hard substrate may be selected from thermoplastic resins selected from the group consisting of polypropylene, polyethylene, polycarbonate, polybutylene terpthalate, polyamides such as nylon 6, nylon 11, acrylonitrile-butadiene-styrene copolymer (ABS), styrene-acrylonitrile copolymer, polyacetal, and the like. The hard substrate can also be a metal.

The soft thermoplastic elastomer blend composition will also contain a processing oil, such as a paraffinic oil and/or a naphthenic oil. Examples of such oils that can be used include Paralux™ process oils 701R, 1001R, 2401R, 6001R, from Chevron and the like. It is preferred to use an oil with a high flash point for better retention of the oil. Naphthenic oils are preferred with for use in blends having relatively high styrene content and paraffinic oils are preferred for utilization in conjunction with blends having a relatively low styrene content. In this invention, elastomers and rubbers are used interchangeably. The terms vulcanized, crosslinked, and cured are also used interchangeably herein. The term dynamically vulcanized indicates that the crosslinkable repeat units of the elastomer are crosslinked during the thermo-mechanical mixing step during mixing with the thermoplastic resin.

The soft thermoplastic elastomer blend composition may also contain reinforcement or fillers selected from the group consisting of talc, clay, calcium carbonate, silica, carbon black, and wollastonite.

The hard thermoplastic resin substrate may also contain a reinforcement selected from the group consisting of talc, wollastonite, calcium carbonate, glass fibers, glass spheres, and silica.

The preparation of the soft-thermoplastic elastomer composition may be carried out in a continuous mixer, or a combination of a continuous mixer and a batch mixer. When a batch mixer is used, the discharged and uncrosslinked blend may be fed through a single screw-extruder and pelletized. When a continuous mixer is used, the blend may be pelletized after discharging from the twin-screw extruder. The dynamic vulcanization of the unsaturated diene elastomer or rubbery polymer or elastomer will be preferably carried out in a continuous mixer such as a twin-screw extruder or a Farrel continuous mixer.

The soft-thermoplastic elastomer composition can be comprised of a continuous matrix phase of the thermoplastic resin with the rubbery elastomer and the block copolymer being present as dispersed phases. In another embodiment of this invention the rubbery polymer, the thermoplastic resin, and the highly saturated elastomer can all be present in the soft-thermoplastic elastomer as co-continuous phases. In still another embodiment of this invention the highly saturated elastomer can be present as the continuous matrix phase with the thermoplastic resin and the rubbery elastomer being present as dispersed phases. The thermoplastic resin may also form a co-continuous phase with the block copolymer.

A crosslinking agent such as peroxide may be used to crosslink the elastomer, or SEBS or both to modify the mechanical properties and improve oil resistance and compression set. If polypropylene resin is used, there may be a further reduction in the melt viscosity due to the reduction of the molecular weight of the polypropylene. If a polyethylene resin is used, the resin may also be crosslinked. The resistance of the overmolded thermoplastic elastomer composition to the paraffinic oils may be improved by increasing the styrene content in the solution styrene-co-butadiene random copolymer or solution styrene-co-isoprene random copolymer that may be used for the thermoplastic elastomer composition, more preferably from 10 to about 40 percent by weight of the said solution SBR or solution styrene-co-isoprene random copolymer.

It is possible to pre-blend the solution diene elastomer with the hard thermoplastic resin such as polypropylene, polystyrene, or polyphenylene ether, in the first mixing step and optionally, crosslinking the diene rubber fully or partly. It is then possible to mix the blend of the fully or partially crosslinked diene rubber and thermoplastic resin formed in the first step with the block copolymer in a second mixing step. This two-step mixing sequence may ensure crosslinking of only the diene rubber phase and not the highly saturated elastomer, particularly when the crosslinking agent is a peroxide-based curing agent. The dynamic vulcanization of the rubbery elastomer is preferably carried out in a continuous process, more particularly in a twin-screw extruder. The dynamic vulcanization of the unsaturated diene elastomer or rubbery polymer or elastomer will be preferably carried out in a continuous mixer such as a twin-screw extruder or a Farrel continuous mixer.

Thermoplastic elastomer compositions may be further modified with compounds or compatibilizers that contain functional and polar groups that have high affinity towards the thermoplastic being overmolded. Such compounds or compatibilizers are well known to those skilled in this art. Few examples of the compatibilizers include maleated-ethylene propylene diene rubber, ethylene-co-ethyl or butyl acrylate-co-glycidyl methacrylate, maleated polypropylene, chlorinate-polypropylene, ethylene-co-acrylic acid and the like. The functional group containing compounds enhance the adhesion between the overmolded soft-thermoplastic elastomer and the hard thermoplastic resin substrate.

The overmolding of the soft thermoplastic composition can be achieved by a two shot or multi-component injection molding process or co-injection molding process. Such processes are generally described in "Special Technologies for Injection Moulding of TPE", Peter Pokorny, Engel Maschinebau GmbH, TPE 2000, 6 & 7 Mar. 2000, Paper 17, Amsterdam, conference proceedings. The teachings of this reference are incorporated herein by reference. The soft-thermoplastic elastomer overmolded onto the hard thermoplastic resin substrates are also described in "New Horizons in Thermoplastic Elastomers," Stephen J. Duckworth, M. A. Hanna Engineered Materials Europe, TPE 2000, 6 & $7^{th}$ Mar. 2000, Paper 5, Amsterdam, and the teachings thereof are also incorporated herein by reference.

The soft overmolding can also be accomplished by insert injection molding carried out in two steps. In the first step, the thermoplastic substrate is molded and is subsequently inserted in another cavity for overmolding in the next step into the soft thermoplastic elastomer. The soft thermoplastic elastomers can be overmolded on a rigid metal substrate by insert injection molding processes.

The soft thermoplastic elastomer composition can also be processed by either an extrusion or an injection molding process and the formed soft sleeve can be slipped onto the solid thermoplastic or metal substrate. The composition can also be injection molded or extruded or blow molded over the hard substrate.

The thermoplastic elastomer blends may also contain antiozonants and oxidants that are known to a rubber chemist of ordinary skill. The antiozonants may be physical protectants such as waxy materials that come to the surface and protect the part from oxygen or ozone or they may chemical protectors. The chemical protectors may be selected from the class of styrenated phenols, butylated octylated phenol, butylated di(dimethylbenzyl) phenol, p-phenylenediamines, butylated reaction products of p-cresol and Dicyclopentadiene (DCPD), polyphenolic antioxidants, hydroquinone derivatives, quinoline, diphenylene antioxidants and thioester antioxidants and the like and their blends. Some representative trade names of suitable products include Wingstay® S antioxidant, Wingstay® T antioxidant, Polystay®C antioxidant, Polystay® 100 antioxidant, Polystay® 100 AZ antioxidant, Polystay® 200 antioxidant, Wingstay® L antioxidant, Wingstay® LHLS antioxidant, Polystay® K antioxidant, Polystay® 29 antioxidant, and Wingstay® SN-1. The antioxidants and antiozonants used will preferably be non-staining and non-migratory. For applications that require non-black pigmentation or compositions where the natural color may be desired, carbon black may not be used and above mentioned antioxidants and antiozonant may be used instead. It is important that the said elastomer contains a significant portion of the antioxidant and antiozonant and/or carbon black (whenever used) in the said blends.

For providing additional stability against UV radiation, hindered amine light stabilizers (HALS) and UV absorbers may be also used in the thermoplastic elastomer composition. A skilled person is aware of such stabilizers. For example, Tinuvin® RTM 123, 144, 622, 765, 770 and 780, and Chemisorb® TTM-944 and the like may be employed. These kinds of UV stabilizers are available from Ciba Specialty Chemicals and Cytex Industries.

When the solution elastomeric phase is fully or partially cured in the thermoplastic elastomer compositions, curatives of the known art may be employed. The curing may be accomplished by dynamic vulcanization, wherein the rubber phase is generally crosslinked simultaneously as it is being mixed with the thermoplastic resin. The curatives may be selected from sulfur based, peroxide based, or phenolic based curatives. U.S. Pat. No. 3,758,643, U.S. Pat. No. 3,806,558, U.S. Pat. No. 5,051,478,U.S. Pat. No. 4,104,210, U.S. Pat. No. 4,130,535, U.S. Pat. No. 4,202,801, U.S. Pat. No. 4,271,049, U.S. Pat. No. 4,340,684, U.S. Pat. No. 4,250,273 4,927,882, U.S. Pat. No. 4,311,628 and U.S. Pat. No. 5,248,729 teach the type of curing or crosslinking agents and methods that can be utilized and the teaching of these references are incorporated herein by reference.

When sulfur based curing agents are employed for curing the diene containing solution elastomer, accelerators and cure activators may be used. Accelerators are used to control the time and/or temperature required for dynamic vulcanization and to improve the properties of the thermoplastic composition. In one embodiment, a single accelerator system may be used, i.e., primary accelerator. The primary accelerator(s) may be used in total amounts ranging from about 0.5 to about 4, preferably about 0.8 to about 1.5 phr (parts by weight per hundred parts by weight of rubber). In another embodiment, combinations of a primary and a secondary accelerator might be used with the secondary accelerator being used in smaller amounts, such as from about 0.05 to about 3 phr, in order to activate and to improve the properties of the thermoplastic elastomer composition. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound. Certain processing aids and cure activators such as stearic acid and zinc oxide (ZnO) may also be used. When peroxide based curing agents are used, co-activators or coagents that are known to a rubber chemist of ordinary skill may be used in combination with the peroxides. These coagents may include trimethylolpropane triacrylate (TMPTA), trimethylolpropane trimethacrylate (TMPTMA), triallyl cyanurate (TAC), triallyl isocyanurate (TAIC), and the like. The peroxide crosslinkers and the coagents that may be employed for partial or complete dynamic vulcanization can be selected from the journal publication, "Peroxide Vulcanization of Elastomer", Vol. 74, No 3, July-August 2001, the teachings of which are incorporated here by reference.

Hydrosilation (also known in the art as hydrosilylation) crosslinking may also be employed to crosslink the diene-containing rubbery elastomer. The thermoplastic elastomer containing a diene containing crosslinkable elastomer will preferably be crosslinked with a hydrosilation system wherein the hydrosilation catalyst is selected from the group consisting of a platinum, platinum zero compounds complexed with compounds selected from carbon monoxide, fumarates, phosphines, di- or tetravinyltetramethyldisiloxanes, palladium, chloroplatinic acid, platinum chloride complexes in alcohols, and rhodium, that is complexed with a member selected from divinyltetramethyldisiloxanes or cyclovinylmethylsiloxanes wherein additional divinylsiloxanes or polyvinylmethylcyclosiloxanes are present, wherein the catalyst or catalyst complexed compounds are incorporated on the block copolymer, crosslinkable elastomer, and/or oil, and are preferably present from about 0.0015 to about 1 parts metal by weight of the crosslinkable elastomer. The hydrosilation agent will most preferably be tetrakis (dimethylhydrogensiloxy)silane. The hydrosilation catalyst will most preferably be a platinum zero compound that is complexed with carbon monoxide and polyvinylmethylcyclicsiloxanes to give a platinum carbonyl complex in cyclic methylvinylsiloxanes.

The rubbery polymers that can be utilized in making the blends of this invention are synthesized utilizing a free radical emulsion polymerization technique. These rubbery polymers are comprised of repeat units which are derived from (a) butyl acrylate, or optionally a mixture of butyl acrylate and 2-ethylhexyl acrylate containing up to about 40 percent 2-ethylhexyl acrylate, (b) methyl methacrylate, ethyl methacrylate, methyl acrylate or ethyl acrylate, (c) acrylonitrile, (d) styrene and (e) a crosslinking agent. The crosslinking agent is typically a multi-functional acrylate, a multi-functional methacrylate or divinylbenzene. Some specific examples of crosslinking agents which can be used include ethylene glycol methacrylate, divinylbenzene and 1,4-butanediol dimethacrylate.

Technically, the rubbery polymers of this invention contain repeat units (chain linkages) which are derived from (a) butyl acrylate, or optionally a mixture of butyl acrylate and 2-ethylhexyl acrylate containing up to about 40 percent 2-ethylhexyl acrylate, (b) methyl methacrylate, ethyl methacrylate, methyl acrylate or ethyl acrylate, (c) acrylonitrile, (d) styrene and (e) a crosslinking agent. These repeat units differ from the monomers that they were derived from in that they contain one less carbon-carbon double bond than is present in the respective monomer. In other words, a carbon-to-carbon double bond is consumed during the polymerization of the monomer into a repeat unit in the rubbery polymer. Thus, in saying that the rubbery polymer contains various monomers, in actuality means that it contains repeat units which are derived from those monomers.

The acrylate rubbery polymers useful in this invention will normally contain (a) from about 40 weight percent to about 80 weight percent butyl acrylate, or optionally a mixture of butyl acrylate and 2-ethylhexyl acrylate containing up to 40 weight percent 2-ethylhexyl acrylate, (b) from about 5 weight percent to about 35 weight percent methyl methacrylate, ethyl methacrylate, methyl acrylate or ethyl acrylate, (c) from about 4 weight percent to about 30 weight percent acrylonitrile, (d) from about 3 weight percent to about 25 weight percent styrene and (e) from about 0.25 weight percent to about 8 weight percent of a crosslinking agent.

Such acrylate rubbery polymers will preferably contain (a) from about 50 weight percent to about 80 weight percent butyl acrylate, or optionally a mixture of butyl acrylate and 2-ethylhexyl acrylate containing up to about 40 percent 2-ethylhexyl acrylate, (b) from about 3 weight percent to about 25 weight percent of at least one member selected from the group consisting of methyl methacrylate, ethyl methacrylate, methyl acrylate and ethyl acrylate, (c) from about 6 weight percent to about 30 weight percent acrylonitrile, (d) from about 5 weight percent to about 18 weight percent styrene and (e) from about 0.5 weight percent to about 4 weight percent of a crosslinking agent.

The acrylate rubbery polymer will more preferably be comprised of repeat units which are derived (a) from about 55 weight percent to about 75 weight percent butyl acrylate, or optionally a mixture of butyl acrylate and 2-ethylhexyl acrylate containing up to about 40 percent 2-ethylhexyl acrylate, (b) from about 5 weight percent to about 20 weight percent of at least one member selected from the group consisting of methyl methacrylate, ethyl methacrylate, methyl acrylate and ethyl acrylate, (c) from about 10 weight percent to about 25 weight percent acrylonitrile, (d) from about 8 weight percent to about 14 weight percent styrene and (e) from about 1 weight percent to about 3 weight percent of a crosslinking agent. The percentages reported in this paragraph are based upon the total weight of the acrylate rubbery polymer.

When the elastomer is at least partially crosslinked, the degree of crosslinking may be measured by dissolution of the blend in a solvent for specified duration, and using certain calculations to compensate for the insoluble or resin portion and then calculate % gel or unextractable rubber. The percent gel would normally increase with increasing crosslinking level. These techniques are well defined and established and are known to the persons that are skilled in this art. The percent gel content in the thermoplastic blends, more so in the TPVs may be anywhere in the range of about 5% to 100%.

The thermoplastic vulcanizate composition will preferably contain an elastomer that is a copolymer of a vinyl aromatic monomer, butadiene, and isoprene. One such example is a copolymer elastomer of styrene, butadiene, and isoprene. The styrene content in the elastomer may vary up to 50% by weight, the isoprene content may vary from about 5 to about 95% by weight, and the butadiene content may vary from about 5 to about 95% by weight.

In the thermoplastic vulcanizate composition, either a blend of styrene butadiene rubber and polyisoprene rubber, or a blend of isoprene-butadiene copolymer rubber and styrene butadiene copolymer rubber may be used, wherein the aforementioned respective rubbers may be crosslinked in the thermo-mechanical mixing step. Also, blends of the styrene, isoprene, and butadiene copolymer rubber with a copolymer rubber of styrene, acrylate, acrylonitrile, and methacylate monomer or repeat units rubber may also be used. A blend of a copolymer of styrene-isoprene with a copolymer of styrene-butadiene may also be used to prepare the thermoplastic vulcanizate composition.

The ratio of the butadiene to isoprene repeat units in the thermoplastic vulcanizate composition may vary in the range of about 2:98 to about 98:2, more preferably in the range of about 20:80 to about 80:20. The isoprene and butadiene units may be co-crosslinked or simultaneously crosslinked during the thermomechanical mixing step.

During the thermomechanical mechanical mixing step, it is possible to further crosslink the acrylate ter-elastomer with its molecules or with the molecules of styrene, butadiene, and isoprene elastomer. In this invention, it is also possible to mix a copolymer of isoprene and butadiene with a copolymer of styrene and butadiene, and co-crosslink the diene containing repeat units during the thermo-mechanical mixing step. It is also possible to mix a copolymer of the styrene and butadiene with the acrylate ter-elastomer and co-crosslink during the thermo-mechanical mixing step.

The amount of isoprene repeat units present in the thermoplastic elastomer composition can be varied depending upon the performance that is desired. Isoprene repeat units have a tendency to chain scission and for applications that require multiple passes through thermo-mechanical mixing equipments, isoprene content may be reduced. A wide spectrum of thermoplastic elastomer compositions with varying hardness can be obtained by reducing the oil content, increasing the thermoplastic resin content, and reducing, increasing, or eliminating the block copolymer content.

The thermoplastic resin in the thermoplastic vulcanizate composition may be present in the range of up to and about 70% by weight, more preferably up to and about 50% by weight, and most preferably 5% to and about 30% by weight.

The crosslinked elastomers (excluding the block copolymers) may be present in the range of up to and about 80% by weight, more preferably 25% to and about 50% by weight, and most preferably 5% to and about 15% by weight.

The oil may be present in the range of 5% to about 70% by weight, more preferably from 15% to about 40% by weight.

The block copolymer can optionally be present at a level of up to about 80 weight percent. The block copolymer will typically be present at a level within the range of 5 weight percent to 80 weight percent and will more typically be present at a level of 10 weight percent to 50 weight percent. The block copolymer will most typically be present at a level within the range of 15 weight percent to 35 weight percent.

The soft thermoplastic elastomer compositions over-molded on a hard thermoplastic resin substrate may be used in a shaving razor, toothbrush, pen grips, power tools, kitchen appliances, utensils, and keypads.

The Young's modulus of the soft thermoplastic elastomer blend composition as measured by the initial slope of the stress strain curve in a tensile measurement such as ASTM D 638 will be preferably at least 10 MPa less than the Young's modulus of the hard substrate.

This invention is illustrated by the following examples that are merely for the purpose of illustration and are not to be regarded as limiting the scope of the invention or the manner in which it can be practiced. Unless specifically indicated otherwise, parts and percentages are given by weight.

Thermoplastic vulcanizate compositions were prepared in an intermeshing, co-rotating twin screw extruder with a screw diameter of 25 mm and an extruder length to screw diameter ratio of 48. The first barrel of the extruder was unheated, the second through fourth barrels were heated to 250° C. and the last 8 barrels and the die were heated to 225° C. The extruder was operated at a screw speed of 300 RPM with a total throughput of 20 lb/h. The bale form of Solflex® 2515 SBR and Sibrflex® 2550 SIBR were ground into a crumb form and were partitioned with 3% talc for free feeding into the extruder throat. All polymers were fed into the first barrel of the extruder. The oil was added into the 3rd barrel of the extruder. The Vulcup® 40 KE peroxide curing agent or free radical generator was added into the 5th barrel of the extruder, after the polymer ingredients and oil were well mixed. In Example 1 (Control), the styrene butadiene random copolymer rubber was dynamically crosslinked, with the substantial number of butadiene units crosslinked. In Example 2, the random copolymer of styrene butadiene and isoprene copolymer rubber was crosslinked, with substantial number of butadiene units crosslinked and some isoprene units also crosslinked. Some isoprene units may undergo chain scission in presence of a free-radical generator that may be avoided by using alternate curing agents such as phenolic and/or hydrosilylation. In Example 3, an acrylate rubber Sunigum® P 95 rubbery polymer, that was pre-crosslinked to a certain degree by the supplier, was mixed with Sibrflex® 2550 SIBR and the mixture was dynamically vulcanized. Sunigum® P 95 rubbery polymer is a copolymer rubber obtained by copolymerization of styrene, acrylonitrile, butyl acrylate, methyl methacylate, acylic acid, methacrylic acid, and divinyl benzene. U.S. Pat. Nos. 5,616,651 and 6,337,374 describe the composition and preparation of the Sunigum® elastomer and are incorporated herein by reference.

TABLE 1

Compositions in Weight % for Preparing Thermoplastic Vulcanizate Compositions

|  | Example 1 (Control) | Example 2 | Example 3 |
|---|---|---|---|
| Solflex ® 2515[a)] | 15.4 | — | — |
| Sibrflex ® 2550[b)] | — | 15.4 | 7.7 |
| Sunigum ® P95[c)] | — | — | 7.7 |
| Blendex ® HPP820[d)] | 13.7 | 13.7 | 13.7 |
| Kraton G ® 1651[e)] | 23.8 | 23.8 | 23.8 |
| Paralux ® 6001R[f)] | 39.7 | 39.7 | 39.7 |
| Iraganox ® 1010[g)] | 0.1 | 0.1 | 0.1 |
| Mistron ® Vapor R[h)] | 7.1 | 7.1 | 7.1 |

TABLE 1-continued

Compositions in Weight % for Preparing Thermoplastic Vulcanizate Compositions

|  | Example 1 (Control) | Example 2 | Example 3 |
|---|---|---|---|
| Vulcup ® 40KE[i)] | 0.2 | 0.2 | 0.2 |
| Total | 100 | 100 | 100 |

[a)]Solflex ® 2515 is a solution polymerized styrene butadiene random copolymer with 25% bound styrene and 15% 1,2 butadiene (vinyl) units
[b)]Sibrflex ® 2550 is a solution polymerized styrene, butadiene and isoprene random copolymer with 25% bound styrene, 50% isoprene, and 25% butadiene content, with isoprene content consisting of 3,4 isoprene (vinyl), 1,2 isoprene, and cis, and trans isoprene units, and butadiene content consisting of 1,2 butadiene (vinyl), cis, and trans butadiene units
[c)]Sunigum ® P 95 is a carboxylic acid functionalized acrylate, styrene, acrylonitrile ter-elastomer from Eliokem Inc.
[d)]Blendex ® HPP820 is a polyphenylene ether resin of 0.4 dl/g intrinsic viscosity supplied by The General Electric Company's Specialty division
[e)]Kraton G ® 1651 is a high molecular block copolymer with styrene end blocks and rubbery hydrogenated mid blocks (Styrene-ethylene butylene-Styrene) from Kraton Polymers
[f)]Paralux ® 6001R is a paraffinic process oil from Chevron
[g)]Iraganox ® 1010 is a phenolic antioxidant from Ciba
[h)]Mistron ® Vapor R is talc supplied by Luzenac
[i)]Vulcup ® 40KE is a peroxide free-radical generator and crosslinking agent from Geo Specialty Chemicals The samples were molded in an injection-molding machine. Measurement of the physical properties of the compositions disclosed in this invention were performed in accordance with the following ASTM Standard Test Methods; Durometer hardness D2240-00, tensile properties D412-98a test method A, compression set D395-01 method B, and compressive Modulus of Elasticity ASTM D695-02a.

The processing observations (extrudate and molded plaque appearance) and physical properties of the soft TPE formulations of Table 1 are given below in Table 2.

TABLE 2

Physical Properties

|  | Example 1 (Control) | Example 2 | Example 3 |
|---|---|---|---|
| Shore A Hardness | 38 | 21 | 20 |
| Tensile Strength (MPa) | 2 | 0.9 | 1.1 |
| % Elongation @ Break | 310 | 406 | 435 |
| Compressive Modulus Of Elasticity (Mpa) | 1.9 | 0.8 | 0.9 |
| % Compression Set | 35.8 | 39.3 | 50 |
| Extrusion Appearance | Rough | Smooth | Smooth |
| Molded Plaques Appearance | Rough | Smooth | Smooth |

Example 2 is the thermoplastic vulcanizate that contains an elastomeric copolymer of styrene, butadiene and isoprene monomer units that was crosslinked during the thermo-mechanical mixing. The presence of both butadiene and isoprene units in the crosslinked elastomer enabled a very-soft composition, a non-oily surface, high elongation, and good balance of processability. The presence of isoprene repeat units in addition to the butadiene repeat units in the crosslinked elastomer of Example 2 enabled a soft composition without the addition of extra amounts of oil that has the tendency to leach out to the surface. Example 3 contains two elastomers namely a styrene, butadiene, and isoprene random elastomer and an acrylate terelastomer that was pre-crosslinked to a certain degree prior to the thermo-mechanical mixing step. Example 3 also had low hardness, high elongation, a non-oily surface, smooth extrudate and molded surface appearance.

While certain representative embodiments and details have been shown for the purpose of illustrating the subject invention, it will be apparent to those skilled in this art that various changes and modifications can be made therein without departing from the scope of the subject invention.

What is claimed is:

1. A thermoplastic vulcanizate composition comprised of (a) thermoplastic resin selected from the group consisting of polyphenylene ether, polypropylene, polyethylene, and polystyrene, (b) an elastomer, wherein the elastomer is a polymer of butyl acrylate, acrylonitrile, a methacrylate monomer, and a vinyl aromatic monomer, wherein the elastomer is at least partially crosslinked, and wherein the repeat units in the elastomer are distributed throughout the elastomer in an essentially random manner, and (c) an oil.

2. A thermoplastic vulcanizate composition as specified in claim 1 which further comprises a block copolymer comprising a first polymeric block that is comprised of repeat units that are derived from a vinyl aromatic monomer and a second block that is comprised of repeat units that are derived from a conjugated diolefin monomer, wherein the repeat units in the second block are hydrogenated, and wherein the repeat units in the second block are elastomeric in nature.

3. A thermoplastic vulcanizate composition as specified in claim 1 wherein the thermoplastic resin is present at a level of up to about 70% by weight.

4. A thermoplastic vulcanizate composition as specified in claim 1 wherein the thermoplastic resin is present at a level of 25% to about 50% by weight.

5. A thermoplastic vulcanizate composition as specified in claim 2 wherein the thermoplastic resin is present at a level of 5% to about 15% by weight.

6. A thermoplastic vulcanizate composition as specified in claim 1 wherein the crosslinked elastomers are present at a level of up to about 80% by weight.

7. A thermoplastic vulcanizate composition as specified in claim 1 wherein the crosslinked elastomer is present at a level of up to about 50% by weight.

8. A thermoplastic vulcanizate composition as specified in claim 2 wherein the crosslinked elastomer is present at a level of 5% to about 30% by weight.

9. A thermoplastic vulcanizate composition as specified in claim 2 wherein the block copolymer is present at a level of 5% to about 80% by weight.

10. A thermoplastic vulcanizate composition as specified in claim 2 wherein the block copolymer is present at a level of 10% to about 50% by weight.

11. A thermoplastic vulcanizate composition as specified in claim 2 wherein the block copolymer is present at a level of 15% to about 35% by weight.

12. A thermoplastic vulcanizate composition as specified in claim 2 wherein the oil is present at a level within the range of 5% to about 70% by weight.

13. A thermoplastic vulcanizate composition as specified in claim 1 wherein the oil is present at a level within the range of 15% to about 40% by weight.

14. A thermoplastic vulcanizate composition comprised of (a) thermoplastic resin selected from the group consisting of polyphenylene ether, polypropylene, polyethylene, and polystyrene, (b) an elastomer, wherein the elastomer is a copolymer rubber of a vinyl aromatic monomer, butadiene, and isoprene having a ratio of butadiene repeat units to isoprene repeat units in the range of about 98:2 to about 2:98, wherein the elastomer is at least partially crosslinked, and wherein the repeat units in the elastomer are distributed throughout the elastomer in an essentially random manner, and (c) an oil.

15. A thermoplastic vulcanizate composition as specified in claim 14 wherein the ratio of the butadiene repeat units to the isoprene repeat units is in the range of about 80:20 to about 20:80.

16. A thermoplastic vulcanizate composition as specified in claim 1 wherein the elastomer is crosslinked prior to a dynamic vulcanization step.

17. A thermoplastic vulcanizate composition as specified in claim 2 wherein the block copolymer is selected from the group consisting of styrene-ethylene, butylene-styrene block copolymers, styrene-ethylene, propylene-styrene block copolymers, styrene-ethylene, propylene block copolymers, styrene-ethylene, ethylene propylene-styrene block copolymers, partially hydrogenated products of styrene-isoprene, butadiene-styrene block copolymers, styrene-butadiene-styrene block copolymers, and styrene-isoprene-styrene block copolymers.

18. An article of manufacture that is comprised of a soft thermoplastic elastomer composition overmolded or extruded onto a hard substrate wherein the soft thermoplastic composition is comprised of the thermoplastic vulcanizate composition specified in claim 2.

19. A process for manufacturing an article of manufacture that comprises (1) melt blending the thermoplastic vulcanizate specified in claim 2.

20. A thermoplastic vulcanizate composition as specified in claim 2 wherein the crosslinked the elastomer is coupled with tin or silicon.

21. A thermoplastic vulcanizate composition as specified in claim 2 wherein the ratio of the butadiene to isoprene repeat units in the crosslinked elastomer is in the range of about 2:98 to about 98:2.

22. A thermoplastic vulcanizate composition as specified in claim 17 wherein the block copolymer is crosslinked.

23. A thermoplastic vulcanizate composition as specified in claim 14 wherein the vinyl aromatic monomer is styrene.

24. A thermoplastic vulcanizate composition as specified in claim 14 wherein the oil is present at a level within the range of 15% to about 40% by weight.

* * * * *